United States Patent [19]
Braude

[11] Patent Number: 5,282,128
[45] Date of Patent: Jan. 25, 1994

[54] APPARATUS AND METHOD FOR DETERMINING GRADIENTS OF PROCESS VARIABLES

[76] Inventor: Eric J. Braude, 101 Christian Way, North Andover, Mass. 01845

[21] Appl. No.: 797,783

[22] Filed: Nov. 25, 1991

[51] Int. Cl.$^5$ ............................................. G05B 13/02
[52] U.S. Cl. .................................... 364/148; 364/152
[58] Field of Search ............... 364/148, 162, 401, 402, 364/408, 152, 154

[56] References Cited

U.S. PATENT DOCUMENTS 5,032,525  7/1991  Lee et al. ............................ 436/55

Primary Examiner—Jerry Smith
Assistant Examiner—Paul Gordon
Attorney, Agent, or Firm—Gary D. Clapp

[57] ABSTRACT

A method and an apparatus for operating directly with the program code of a process for determining the gradients of process variables of interest with respect to process parameters. Each process will contain one or more process variable declarations wherein each process variable declaration defines a process variable. There will also be one or more process function assignments associated with each process variable, wherein each process function assignment assigns a value to the associated process variable. One or more gradient variables will be introduced into the process for each process variable of interest, wherein each gradient variable corresponds to and represents the partial derivative, or gradient, of the process variable of interest with respect to a parameter whose value affects the value of the process variable of interest. One or more gradient function assignments will then be inserted into the process for each occurrence of a process function assignment associated with a process variable of interest. Each gradient function assignment will correspond to one of the gradient variables corresponding to the process variable of interest and will assign a value to the gradient variable.

21 Claims, 2 Drawing Sheets

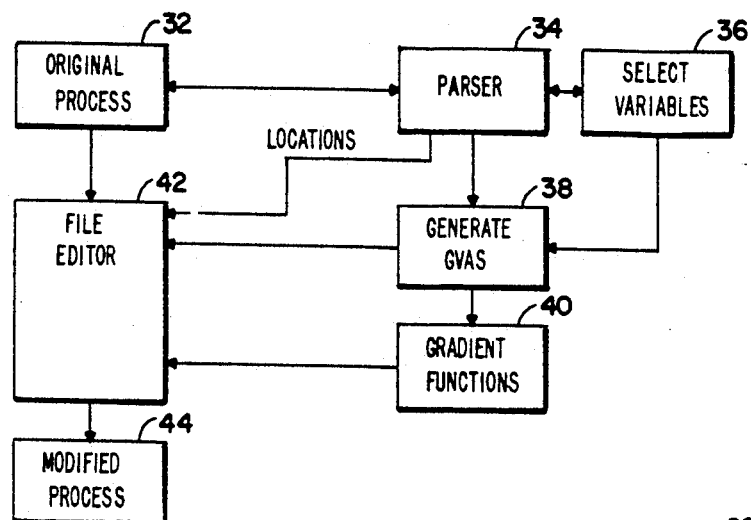
Fig. 3
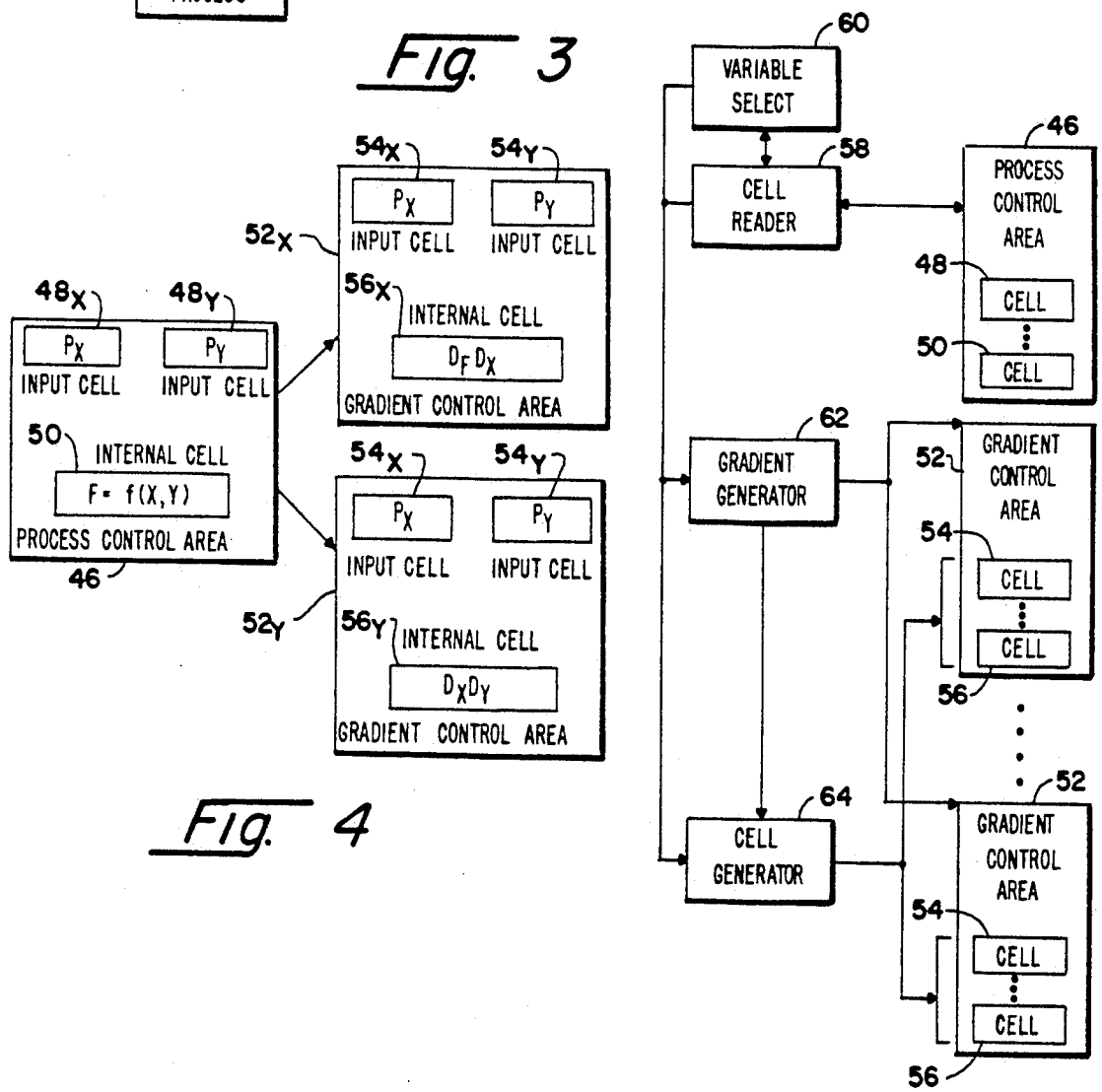
Fig. 4
Fig. 5

APPARATUS AND METHOD FOR DETERMINING GRADIENTS OF PROCESS VARIABLES

FIELD OF THE INVENTION

The present invention relates to the monitoring and control of processes and, more particularly, to the determination of the rate and direction of change, or gradient, of process variables with respect to other process variables for purposes of monitoring and control of a process.

BACKGROUND OF THE INVENTION

A process may be broadly defined as a set of operations performed on some input to provide a desired result. Examples of such would be a spreadsheet, a database management system, a financial prediction program, a communications network control system, or a design simulation, which operates on data representing financial information, communications requirements or information describing a system or device being simulated. Other examples include a process controlling an industrial or chemical process which accepts data representing operation of the industrial or chemical process to provide outputs controlling the process. The present most common implementation of such a process is as a program executed by a processing unit such as a central processing unit or a microprocessor, wherein program defines and controls the set of operations comprising the process.

Such program implemented processes accept input data in the form of input variables, also referred to as parameters, and perform a set of operations with the input parameters and variables generated internally to the process to determine the value of other variables which represent quantities of interest to a user of the process. It is often useful in such processes to be able to determine the rate and direction of change, or gradient, of variables of interest to the user of the process with respect to selected other variables of the process, such as input parameters which are controllable by the user. The information regarding the gradients of the variables of interest may then be used to vary the input parameters in a manner to drive the results generated by the process to a value or values selected as optimum.

The prior art has evolved a number of ways in which to control processes by controlling the input parameters to the process. One approach was "trial and error" wherein the user conducted a number of runs of the process with different values of input parameter to approximate the rate of change of the outputs with respect to the inputs. This approach is very time consuming and provides only approximations to the actual rate of change of outputs with respect to inputs, not an exact value. In addition, this approach is seldom applicable to control processes which operate in "real time", such as processes used to control industrial or chemical processes or, for example, the flight of an aircraft, as it is generally impossible to re-run the process under the same conditions and with the same input parameters.

Another approach is commonly referred to as "perturbation analysis" and generally requires the creation of a mathematical model of a gradient determination process and the running of a simulation of the mathematical model on a computer system to approximate the process. This approach is acknowledged as useful only in a very limited range of processes, such as simple processes simulating simple systems or devices, as the mathematical models quite rapidly become very complex as the complexity of the process increases. This approach requires the creation of a different mathematical model for each type of process to be simulated, and usually for each individual process to be simulated. In addition, this approach involves at least tow levels of abstraction from the actual process, the first in creating a mathematical model of the process, and a second in analyzing the mathematical model of the process to determine a mathematical model of the gradient determination process. The gradient determination process must then be implemented as a computer program. As a result, it is difficult to ensure that the results of the gradient determination process accurately or adequately represent the gradients of the actual process.

"Likelihood ratios" is yet another approach and is similar in most respects to perturbation analysis but applies to a different class of problems and uses sequences of uniform random numbers to drive the simulation.

Yet another approach is referred to as response surface methodology and is essentially a mathematically modelled version of the earlier "trial and error" approach. In response surface methodology the processes is executed a number of times with different input parameters, a greatly simplified mathematical model or expression is created to define a "surface" on which the results lie for each execution of the process, the extreme points on the surface are determined from the mathematical model of the surface. In addition to all of the disadvantages of the "trial and error" method, this approach has the disadvantages that it again does not reflect the operation of the process for all possible input parameters, so that there is substantial uncertainty as to whether the model derived actually represents the actual process, as well as further uncertainties arising from assumptions about the smoothness, or granularity of the surface, which is function of both the model and the number of reiterations of the process. Also, it is very difficult in this approach, as in all of the mathematical modelling approaches, to determine the amount and direction in which to vary the input parameters for successive reiterations of the process modelling when there are a large number of parameters.

Finally, there are at present certain applications programs, such as spreadsheets, which provide a facility for approximating the rate of change of a variable of interest with respect to an input parameter by using a very simplified algebraic model of the spreadsheet processes defined by the user to provide an "educated guess" version of the old "trial and error" method.

The present invention provides a solution to these and other problems of the prior art.

SUMMARY OF THE INVENTION

The present invention provides a method and an apparatus for operating directly with the program code of a process for determining the gradients of process variables of interest with respect to process parameters.

According to the present invention, each process will contain one or more process variable declarations wherein each process variable declaration defines a process variable. There will also be one or more process function assignments associated with each process variable, wherein each process function assignment assigns a value to the associated process variable. A process function assignment is generally of a form which defines the value of the corresponding process variable as a function of one or more other variables, which may include parameters, and defines a set of operations to determine a value of the corresponding process variable according to that function.

According to the present invention, one or more gradient variables will be introduced into the process for each process variable of interest, wherein each gradient variable corresponds to and represents the partial derivative, or gradient, of the process variable of interest with respect to a parameter whose value affects the value of the process variable of interest.

One or more gradient function assignments will then be inserted into the process for each occurrence of a process function assignment associated with a process variable of interest. Each gradient function assignment will correspond to one of the gradient variables corresponding to the process variable of interest and will assign a value to the gradient variable.

As stated, a gradient variable represents the partial derivative of a process variable with respect to a parameter of interest and the function defined by the gradient function assignment which assigns a value to a gradient variable will accordingly be in the form of the partial derivative with respect to that parameter of the function defined by the process function assignment associated with the variable of interest.

The present invention is described in a first aspect as a process including the means and method for determining the gradients of process variables with respect to process parameters, and in a second aspect as the means and methods for modifying a process to allow the determination of the gradients of process variables with respect to process parameters.

The present invention is described in yet further aspects as implementations of the present invention as means and methods for determining the gradients of process variables of a spreadsheet process, and as means and methods for modifying a spreadsheet process to allow determination of the gradients of spreadsheet variables with respect to spreadsheet parameters.

It is therefore an object of the present invention to provide a solution to the problems of the prior art and to provide improved means and methods for determining the gradients of process variables with respect to process parameters.

DESCRIPTION OF THE DRAWINGS

The foregoing and other objects, features and advantages of the present invention will be apparent from the following description of the invention and embodiments thereof, as illustrated in the accompanying figures, wherein:

FIG. 4 is a diagrammatic representation of a spreadsheet process incorporating the present invention; and FIG. 5 is a diagrammatic representation of a means and method for modifying a spreadsheet process according to the present invention.

DESCRIPTION OF A PREFERRED EMBODIMENT

The following will first describe the general principles of the present invention, and will then further describe the present invention through illustrative embodiments and will discuss factors in implementing the present invention.

A. Introduction (FIG. 1)

Figure 1:
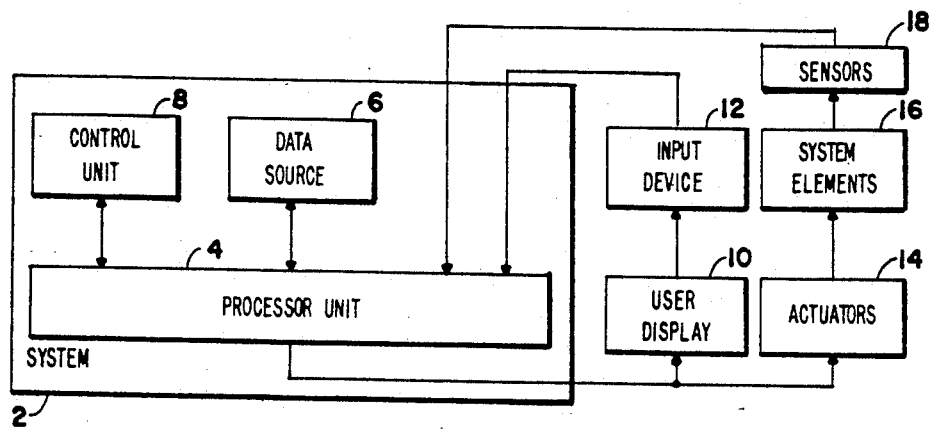
FIG. 1 is a block diagram of a system for performing a process which may incorporate the present invention.

Referring to FIG. 1, therein is represented a generalized System 2 for executing or performing a process according to the present invention. As shown, System 2 includes a Processor Unit 4 which receives data from a Data Source 6 and performs a set of operations on the data under control of command or instruction inputs from Control Unit 8 to generate outputs to a Results Unit 10. The process executed by Processor Unit 4 is comprised of the set of operations performed by Processor Unit 4 and is defined by the set of commands or instructions provided from Control Unit 8. In the most general instance of System 2, Processor Unit 4 may operate interactively with Data Source 6 and Control Unit 8. For example, Processor Unit 4 may use Data Source 6 to store intermediate results of the operations and may interact with Control Unit 8 dependent upon the results of operations executed under control of Control Unit 8 to cause Control Unit 8 to modify the set of operations.

In the most common implementation of a System 2, Processor Unit 4 is a general purpose data processing unit, such as a central processing unit or microprocessor, operating under control of a program stored in Control Unit 8, wherein the sequences of instructions which comprise the program define the process executed by the Processor Unit 4.

Control Unit 8 may commonly be a random access memory or a "hard-wired" read-only-memory, wherein a random access memory allows the program to be easily modified or changed to allow the System 2 to execute a number of different processes, while a read-only-memory is often used where it is possible or desirable to effectively dedicate the System 2 to a single process or a limited set of processes. A random access memory is generally used where it is desirable to reassign System 2 to different processes according to the needs of the users, as in most uses of personal computers and in most business and technical applications wherein, for example, the same computer may be used for word processing, spreadsheets, databases, the development of programs, and the development and testing of simulations. A read-only-memory may be used in instances wherein it is desirable or possible to effectively dedicate System 2 to a single process or limited range of processes, such as the control of chemical or mechanical processes or the dedicated control of electro-mechanical systems, for example, the flight controls of aircraft and the control of the ignition/fuel systems of vehicles. Further in this regard, it should be noted that a System 2 may have other control inputs than a program stored in a memory, such as keyboard inputs, mouse driven inputs from a graphical user interface, and any form of device, such as a switch, control stick, or sensor that may be used to enter control inputs to System 2.

Data Source 6 may similarly be a memory which is used to store data and may in fact be a memory shared by Control Unit 8; in this regard, it is a common practice for many programs to contain data, such as fixed values, which are used in the execution of the processes defined by the programs. Data Source 6, however, may take many forms, depending on the particular process to be executed by the System 2. For example, System 2 may further include a keyboard input, mouse driven inputs from a graphical user interface, and any form of device, such as a switch or control stick or sensor which can provide data inputs to the System 2, or any combination such input devices with a Data Source 6 memory.

Lastly, System 2 will generally include a device or element which is capable of accepting and acting upon the outputs of Processor Unit 4 to generate a representation of results of the process executed by Processor Unit 4. A common example of such a device would be a User Display 10, as is commonly found on computers of all types. Such implementations of System 2 will also generally include a user control and data Input Device 12 which, as described above, may be, a keyboard input, mouse driven inputs from a graphical user interface, a switch or control stick.

In typical example of a System 2, User Display 10 would provide a display to the user indicating, for example, how much disk space is allocated to each user and the historical needs of each user, the relationship of per unit selling price to maximum annual profits, the loading of communications paths in a network, the performance parameters of a simulated design, and travel time or fuel consumption under current conditions. The user would then respond to the displays generated by User Display 10 to provide data inputs to System 2 through a Input Device 12, such as a keyboard or mouse, to control the results of the process executed by System 2 by providing both control inputs and data inputs effecting the results of the process executed by System 2.

Examples of such systems would include a database management system wherein the Control Unit 8 program would operate under guidance of a user to manage the disk space allocated to various users or to various databases, networking and communications programs wherein the Control Unit 8 program would select the network communications paths according to parameters determined by a user, or design simulation programs wherein the Control Unit * program would vary the system parameters under guidance of a user. Yet further examples of such system would including a system for simulating a process or a system executing a program such as a spreadsheet.

It is also common for a System 2 such as illustrated in FIG. 1 to be an integral element of a process system such as an industrial process system or a control system, so that System 2 controls the system of which it is a part. In such a process control system, System 2 would provide outputs from Processor Unit 4 to control various Actuator Elements 14 of the process control system, such as electrical, mechanical, electromechanical, optical or hydraulic actuators, which would in turn control System Process Elements 16, which carry out the actual process which is controlled by Process System 2, such as a chemical processing unit in an oil refinery. The effects of System 2's control outputs through Result Element 10 to Actuator Elements 14 and on System Process Elements 16 would be sensed by Sensor Elements 18, such as chemical or biological sensors, air speed sensors, attitude sensors, accelerometers, and ignition timing controllers. The data outputs of Sensors 18 would then be provided as data inputs to System 2, in parallel with or in place of a Data Source 6, for use in the control process and would thereby comprise the data parameters provided to System 2. The loop comprised of System 2, Actuators 14, Process System Elements 16 and Sensors 18 would thereby form a feedback control loop. Examples of such may include the flight control system of an aircraft, the navigation system of a ship, and the ignition/fuel system of a vehicle of any type and it is common for many such process control systems to further provide a User Display 10 and Input Device 12 for direct user control of the process control system.

B. Embodiment of the Invention (FIGS. 2A and 2B)

1. General Model of the Invention (FIGS. 2A and 2B)

Figure 2A:
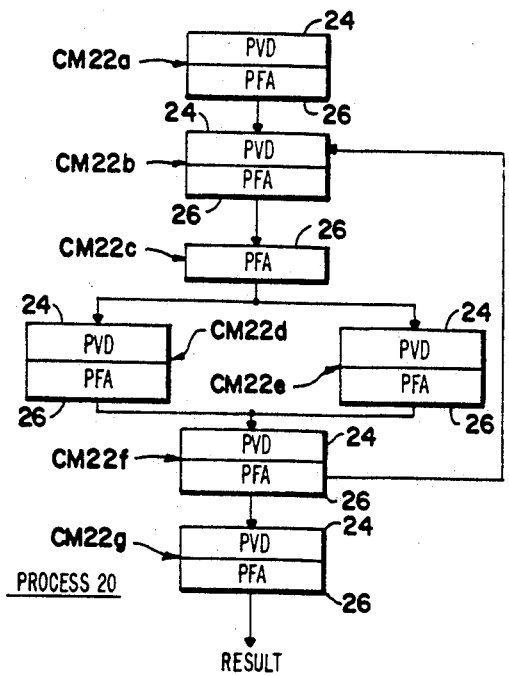
FIG. 2A is a diagrammatic, flow chart representation of a process to incorporate the present invention.
Figure 2B:
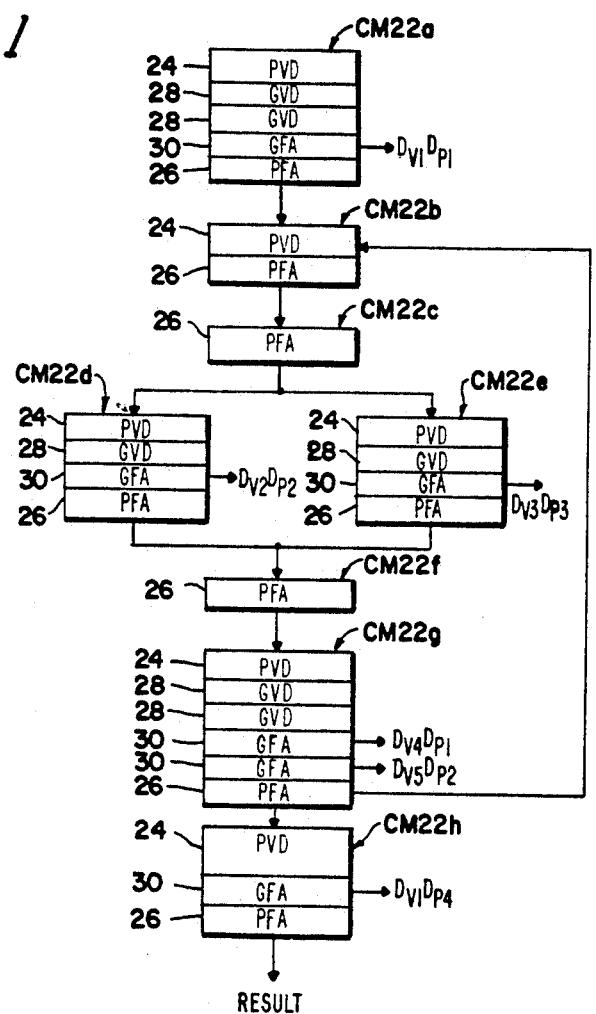
FIG. 2B is a diagrammatic, flow chart representation of a process according to the present invention; and, FIG. 3 is a diagrammatic representation of a system for modifying a process according to the present invention.

Referring now to FIG. 2A, therein is shown a generalized model of a Process 20 which may incorporate the present invention. As has been described, all processes, whether a spreadsheet, a database management system, a financial prediction program, a design simulation, or a control program for an industrial or chemical process, may be defined as a set of operations, or steps, to be performed on data which is provided as inputs to the process, or generated by the process itself. The present most common implementation of processes such as is illustrated in FIG. 2A is as programs for execution by a processing unit, such as a central processing unit or a microprocessor, and, for clarity of presentation and ease of understanding, the Process 20 of FIG. 2A is accordingly represented as a flow diagram of operations to be executed by a processor. While it is to be understood that the process represented in FIG. 2A is for illustrative purposes only, and is not intended to represent any actual process, the process illustrated therein will illustrate the present invention.

As indicated in FIG. 2A, a Process 20 is generally constructed as a set of Control Modules (CMs) 22, represented in FIG. 2A as Control Modules 22a through 22h, which generally define the sets of operations to be performed by a Processor Unit 4. The example represented by FIG. 2A begins with CM 22a which, for example, determines the initial data values to be used by the process and otherwise initiates the execution of the process. Execution of the process then passes to CM 22b, which represents a set of operations which may, for example, select successive values of one or more variables, or data elements, depending upon the outcome of a subsequent CM 22. CM 22b is followed be a CM 22c, which may test the outcome of the operations of CM 22b and branch to either CM 22d or CM 22e, depending on the outcome of the operations of CM 22c. CM 22f receives and combines or selects the results of the operations of CM 22d and 22e, and provides an output to CM 22h. CM 22f in turn may branch back to CM 22b, depending upon the input from CM 22d and 22e, for example, depending upon whether the current input represents the last of a set of repeated operations upon a set of variables, or may provide an output to CM 22g, which generates the final result output as discussed with reference to System 2 of FIG. 1.

As is further represented in FIG. 2A, each Control Module 22 may include a Process Variable Declaration (PVD) 24 and/or a Process Function Assignment (PFA) 26. A PVD 24 contains one or more variable declarations which declare, or define, variables or parameters used in the process, while an PFA 26 is comprised of a set of instructions or commands directing a Processor Unit 4 to execute a set of one or more operations to determine, or change, the value or values of a variable or variables whose values are functions of, that is, depend upon, the values of parameters assigned in the PVD 24s. It will be understood by those of ordinary skill in the art that each CM 22 will often, but not necessarily, include a PVD 24, and that certain CMs 22 may not include an PFA 26, that is, they may be comprised solely of declarations. It will also be understood that each PVD 24 may include declarations for one or more input variables, for one or more internal variables, that is, variables whose values are determined by other variables, or for both input and internal variables and that an PFA 26 may contain functional statements for one or more functional operations. As is well known in the art, Processor Unit 4 may respond to program code relating to the variable declarations by reading data values from Data Source 6, for example, or the actual data values may be provided by the Control Module code itself, for example, when the code states a constant value or set of values which will be used in all executions of the process.

As has been described, the object of the present invention is to provide a means and methods for generating outputs of a process which will represent the rates and direction of change, or gradients, of variables of the process with respect to other variables of the process, and usually with respect to input variables, referred to herein as parameters.

As will become apparent from the following discussions, the present invention operates directly with respect to two elements of any process such as a computer program, the variables of the program and the program functions, or operations, that change or determine the values of variables.

Such elements are recognizable in all styles of programming, including procedural languages such as C, FORTRAN or Cobol, in object oriented languages such as C++, in functional programming and in applications programs such as spreadsheets. It will therefore be understood that while not all processes, that is, not all programs, will have the exact form of the process illustrated in FIG. 2A, other forms of processes will contain the functional equivalents of the declarations and operation function assignments illustrated herein and the application of the present invention to processes expressed in other forms will be apparent to those of ordinary skill in the art. While the following discussions will assume, for clarity of presentation, that the program which is to incorporate the present invention is expressed in source code form, the present invention may be practiced with programs expressed in object code.

First considering the variables which may appear in a process or program such as illustrated in FIG. 2A, certain of the variables which may appear in certain of the PVDs 24 are provided by the Data Source 6, such as a user, and are input variables, referred to hereinafter as parameters. A parameter may be defined as a quantity whose value does not change during the course of an execution of the process. Certain of the parameters are parameters of interest in the present invention as their effect on the outcome or results of the process are of interest to the user of the process.

Other variables, hereinafter generally referred to as variables, are internal to the process and have values determined as a function of other variables, rather than being provided as a parameter, and are generally introduced to the process for the purpose of implementing the process. Such internal variables may correspond to commonly understood values, such as "per unit cost", while others have meaning only within the context of the implementation. Certain of the variables further represent output values of the process which are of interest to the user, such as "operating profit for the month" and are generally referred to hereinafter as "variables of interest". Of these, certain variables of interest are variables whose value can be affected by the values of the input parameters of interest.

To reiterate briefly, each process will contain one or more process variable declarations wherein each process variable declaration defines a process variable. There will also be one or more process function assignments associated with each process variable, wherein each process function assignment assigns a value to the associated process variable, and a given process variable declaration may have a plurality of associated process functions assignments occurring at various points in the process with each associated process function assignment changing, or determining, the value of the process variable.

A process function assignment is generally of a form which defines the value of the corresponding process variable as a function of one or more other variables, which may include parameters, and defines a set of operations to determine a value of the corresponding process variable according to that function.

It has been previously stated that the object of the present invention is to provide a means and method for determining the gradient, that is, the rate and direction of change, of variables of interest relative to parameters of interest.

The present invention determines the gradient of process variables of interest relative to selected parameters by introducing new gradient variables into the program, by inserting corresponding gradient variable declarations into the program, and by introducing corresponding new gradient determination operations into the program, by inserting corresponding gradient function assignments into the program.

According to the present invention, one or more gradient variables will be introduced into the process for each process variable of interest, wherein each gradient variable corresponds to and represents the partial derivative, or gradient, of the process variable of interest with respect to a parameter whose value affects the value of the process variable of interest.

One or more gradient function assignments will then be inserted into the process for each occurrence of a process function assignment associated with a process variable of interest. Each gradient function assignment will correspond to one of the gradient variables corresponding to the process variable of interest and will assign a value to the gradient variable.

As stated, a gradient variable represents the partial derivative of a process variable with respect to a parameter of interest and the function defined by the gradient function assignment which assigns a value to a gradient variable will accordingly be in the form of the partial derivative with respect to that parameter of the function defined by the process function assignment associated with the variable of interest.

It should be noted that, in many if not most instances, all variables of interest and parameters of interest will be known before the above described steps to determine and insert the gradient variable declarations and gradient function assignments are carried out. For example, in many instances the variables of interest are outputs of the process and the parameters of interest are the input parameters to the process. In another example, it is possible to determine all variables and parameters of interest by scanning the process code.

It is therefore generally possible to make all of the gradient variable declarations at once, and to group the declarations at the start of the process, as is the common practice with process variable declarations. The gradient function assignments may then be inserted into the process at the points necessary for correct determination of the gradients of the variables of interest, as described below.

It is possible, for example, in the instance where a process variable has more than one associated process function assignment, for the different process function assignments to use different parameters in determining a value of the variable, thus requiring a set of gradient variables for each process function assignment which does not use the same parameters as the first process function assignment. If the different sets of parameters are not known when the initial gradient variable declarations are made, or if it is more conventional or convenient to do so, the appropriate gradient variable declarations may be made in the process in association with the corresponding gradient function assignments.

Finally, it is important that the operation of the process not in itself prevent the proper operation of the gradient determination functions by disturbing the state of the process before the gradient functions can determine the gradients of the variables of interest. Most systems are sequential in nature, that is, they inherently perform all operations one operation at a time and in a predetermined order and it is necessary in such systems to insert the new gradient functions such that the new gradient functions, and no other operations, are executed prior to any operations on the variables of interest.

Other systems allow the parallel execution of operations which are not inherently sequential in nature, that is, operations which do not in themselves depend on the prior execution of another operation. In such systems, the gradient determination operations described above may be executed in parallel with the process's own operations, so long as the process's operations and the gradient determination operations share identical input parameter values at the point in the process at which the gradients of the variables are to be determined. It is therefore possible to execute some if not all of the gradient variable declarations in parallel, and to execute some if not all of the gradient function assignments in parallel with the corresponding process variable function assignments, so long as doing so does not allow the value of a variable used in a gradient function assignment to be changed with respect to the value of the variable as used in the corresponding process function statement.

Now considering the present invention as described above in further detail, it may be assumed for purposes of description that a process, or program, has variables, that is, parameters, $P_1, P_2, P_3, \ldots, P_n$ and internal variables $v_1, v_2, v_3, \ldots, v_m$. The process may, for example, be a program which simulates activity at an airport and the parameters may represent the average time between departures, the over-booking percentage, and so on. Certain of the internal variables may represent quantities used solely in implementing the program, while others will represent understood quantities, such as delay between arrival at airport and arrival at gate, and some will represent output values of interest to the user, such as operating profit for a month.

The program will, in source code form, contain one or more process variable declarations and, ignoring process function assignments for purposes of clarity, the program may then be represented as <process variable declaration 1>
<process variable declaration 2>
...
<process variable declaration n>, not necessary executed in the order given, with the process variable declarations defining the parameters P and internal variables v.

The following will assume, for purposes of clarity of presentation, that the user is interested in determining the gradients of internal variables with respect to input parameters. According to the present invention, then, for each parameter $P_k$ with respect to which the gradient, that is, rate and direction of change, of some variable of interest is to be determined, and for each variable $v_t$ of interest of the program, a gradient variable $D_{v_t}D_{P_k}$ is declared and initialized, usually to zero. The new gradient variable $D_{v_t}D_{P_k}$ represents the gradient, that is, the derivative, of $v_t$ with respect to $P_k$, is of the same type as $P_k$ and $v_t$, and is of the same scope, that is, the same range of activity within the program, as $v_t$.

Each of the original declarations is replaced, or augmented, as follows:

{<inserted gradient variable declaration 1>
<process variable declaration 1>}
{<inserted gradient variable declaration 2>
<process variable declaration 2>}
...
{<inserted gradient variable declaration n>
<process variable declaration n>}.

Then, for each process function assignment, one or more gradient function assignments, that is, blocks of program code directing sets of processor operations which determine the values of each of the corresponding gradient variables, will be inserted into the process.

The gradient function assignments, are, in each instance, determined as follows:

If a <process function assignment> has the form: $v_r \leftarrow f(P_1, P_2, \ldots, P_m, v_1, v_2, \ldots, v_n)$, that is, $v_r$ is assigned as a function of $P_1, P_2, \ldots, P_m, v_1, v_2, \ldots, v_n$, then the gradient function assignments for $v_r$ are of the form:

$$D_{v_r}D_{P1} \leftarrow f_{P1}(P_1, \ldots, v_n) +$$
$$\text{SUM}_{(i=1 \text{ to } n)}[D_{v_i}D_{P1}]*f_{v_i}(P_1, \ldots, v_n),$$
$$D_{v_r}D_{P2} \leftarrow f_{P2}(P_1, \ldots, v_n) +$$
$$\text{SUM}_{(i=1 \text{ to } n)}[D_{v_i}D_{P2}]*f_{v_i}(P_1, \ldots, v_n),$$
$$\ldots, \text{and}$$
$$D_{v_r}D_{Pm} \leftarrow f_{Pm}(P_1, \ldots, v_n) +$$
$$\text{SUM}_{(i=1 \text{ to } n)}[D_{v_i}D_{Pm}]*f_{v_i}(P_1, \ldots, v_n)$$

where * indicates a multiply operation and where in each instance $D_{va}D_{Pb}$ is the gradient variable representing the gradient of variable $v_a$ (for a from 1 to n) with respect to variable $P_b$ (for b from 1 to m) and $f_{Pa}$ and $f_{vb}$ are respectively the partial derivative of f with respect to $P_a$ and the partial derivative of f with respect to $v_b$.

To illustrate briefly by example, if a process variable declaration and assignment is:

$$v_2 \leftarrow P_1 v_1 + P_2/v_2,$$

then the corresponding gradient variable declarations and gradient function assignments would be:

$$D_{v2}D_{P1} \leftarrow v_1 + D_{v1}D_{P1}*P_1 + D_{v2}D_{P1}*[-P_2/(v_2*v_2)]$$

and $$D_{v2}D_{P2} \leftarrow (1/v_2) + D_{v1}D_{P2}*P_1 + D_{v2}D_{P2}*[-P_2/(v_2*v_2)].$$

To reiterate, each new gradient variable declaration defines a gradient variable $D_{vt}D_{Pk}$ which represents the gradient, that is, the partial derivative, of $v_t$ with respect to $P_k$. For each process variable assignment, there will be a corresponding plurality of gradient function assignments, wherein each gradient function assignment for a variable $D_{vt}D_{Pk}$ is the sum of the partial derivative of the original function of variable $v_i$ with respect to a parameter $P_k$ summed with the summation, over all variables $v_i$ taking part in the function assignment of variable $v_t$, of the products of the partial derivatives of the functions of variables $v_i$ with respect to the parameter $P_k$ and the partial derivative of the original function of $v_t$ with respect to the variable $v_i$.

Again, it may be important in many processes and systems that the gradient function assignments be inserted into the process such that the code of each gradient function assignment, and no other code, must execute before the code of the original process function assignment performing operations on the corresponding variables of interest.

In many instances, however, it may be possible to execute the gradient function assignments corresponding to a block of gradient variable declarations in parallel if the variables are totally independent. In many cases, it will be possible to execute the gradient function assignments corresponding to a given process function assignment in parallel, or as a single set of operations, and this will be advantageous as the gradient function assignments corresponding to a given process function assignment will have many terms in common, as illustrated above, and each of the common terms will need to be executed only once.

It should also be noted that it is often not necessary to insert gradient variable declarations and function assignments for all parameters appearing in a process function assignment as certain of the parameters may not be of interest to the user or may not affect the value of the gradient; for example, a parameter used as an index will not have an effect on a gradient of a process variable.

The present invention as described above is further illustrated in FIG. 2B with respect to the process previously discussed with regard to FIG. 2A. In this simple example, it has been determined that there are six process variables interest. That is, there are six declarations for variables whose values are affected by parameters whose effect on the outcome or results of the process as reflected through the variables of interest, are of interest to the user of the process. For purposes of clarity, it has been assumed that each variable of interest is a function of only one parameter. It has also been assumed, for simplicity, that the declarations of the variables of interest appear in the original code at the start of the Control Modules 22 operating on the variables of interest. It should be noted, however, that as well known in the art, the variable declarations of a process may be grouped at the beginning of the process, that is, in the first Control Module 22 of the process, or may be scattered throughout the process. Further in this example, and again for simplicity and clarity discussion, the new gradient variable declarations will also be grouped at the beginning of the process, with the corresponding original process variable declarations, and the blocks of new gradient determination code will be inserted just before the portions of the original code that operate on the corresponding variables of interest.

In the present example, the process variable declarations of interest appear in CM 22a, $v_1 \leftarrow f_a(P_1)$; CM 22d, $v_2 \leftarrow f_d(P_2)$; CM 22e, $v_3 \leftarrow f_e(P_3)$; CM 22g, $v_4 \leftarrow f_{g1}(P_1)$ and $v_5 \leftarrow f_{g2}(P_2)$; and CM 22h, $v_1 \leftarrow f_h(P_4)$. There are therefore 6 internal variables of interest and 4 input parameters of interest, with $v_1$ and $v_4$ both being functions of parameter $P_1$ and both $v_2$ and $v_5$ being functions of parameter $P_2$. It should be noted that variable $v_1$ has associated with it two process function assignments, one in CM 22a and one in CM 22h, so that the scope of variable $v_1$ includes both CM 22a and CM 22h, wherein the scope of a variable may be defined as those portions of a process within which a particular variable is defined and accessible.

According to the present invention, and in the present example, therefore, six Gradient Variable Declarations (GVDs) 28 will be inserted into the PVDs 24 of CMs 22a, 22d, 22e, 22g and 22h, wherein each gradient variable declaration pertains to a new gradient variable representing the gradient of each of the variables of interest. A GVD 28 for $D_{v1}D_{P1}$ and a GVD 28 for $D_{v1}D_{P4}$ will therefore appear in with the PVD 24 of CM 22a, a GVD 28 for $D_{v2}D_{P2}$ with the PVD 24 of CM 22d, a GVD 28 for $D_{v3}D_{P3}$ in CM 22e, a GVD 28 for $D_{v4}D_{P1}$ and a GVD 28 for $D_{v5}D_{P2}$ in the PVD 24 of CM 22g. A gradient variable declaration for $D_{v1}D_{P4}$ is not required in the PVD 24 of CM 22h as this gradient variable has been declared in CM 22a with the declaration for $D_{v1}D_{P1}$.

Further in accordance with the present invention, one or more Gradient Function Assignments (GFAs) 30 will be inserted each of the process function assignments. In the present example, therefore, six GFAs 30 will be inserted as each process function assignment involves a single parameter, so that there will be one GFA 30 for each process function assignment. Each GFA 30 will comprise the operations necessary to determine the value of the corresponding gradient variable, and thus the gradient of the corresponding variable of interest with respect to the corresponding single parameter whose value effects the value of the variable of interest. Each GFA 30 will be inserted in its respective the CM 22 just before the portions of the original PFA 26 code which operate on the original variables of interest, so that the GFAs 30 will be executed before the corresponding portions of the original PFA 26 code.

In the present example, therefore, a GFA 30 for $D_{v1}D_{P1}$ will therefore appear before the PFA 26 of CM 22a, a GFA 30 for $D_{v2}D_{P2}$ before the GFA 26 of CM 22d, a GFA 30 for $D_{v3}D_{P3}$ in CM 22e, a GFA 30 for $D_{v4}D_{P1}$ and a GFA 30 for $D_{v5}D_{P2}$ before the PFA 26 of CM 22g, and a GFA 30 for $D_{v1}D_{P4}$ before the PFA 26 of CM 22h.

The execution of CM 22a will thereby provide outputs at CM 22a of $D_{v1}D_{P1}$ representing the gradient of internal variable $v_1$ with respect to parameter $P_2$, and so forth for outputs $D_{v2}D_{P2}$, $D_{v3}D_{P3}$, $D_{v4}D_{P1}$ and $D_{v5}D_{P2}$, and $D_{v1}D_{P4}$, from CMs 22d, 22e, 22g and 22h respectively. These gradient outputs may, as described, be provided to a User Display 10 or to such devices as Actuators 14 to indicate to the user or the process control system the rate and direction of change of the internal variables of interest with respect to the parameters of interest. The user may make changes in the input parameters through Input Devices 12 according to the gradient information provided through User Display 10. A process control system will reflect the changes occurring in the process control system because of the outputs of the gradient determination process to Actuators 14 by corresponding changes in the input parameters provided to System 2 from Sensors 18.

The gradient determining means of the present invention may therefore be used directly or indirectly to control the input parameters of interest to the process to optimize the process, for example, in self-controlling processes as are frequently used in industrial processes and vehicular system or in such applications as financial prediction programs, to provide an optimum result sought by the user.

2. Illustrative Embodiment of the Invention

The present invention will be further illustrated by a program example shown in Listings A and B. This illustrative program has two input parameters and one output variable of interest. The input parameters are "unit price", represented in the program by the symbol unit_price, and the "monthly marketing budget", represented by mth_mktg_bgt. The output variable of interest is annual profit, represented by the quantity profit. Variables months_profit and number_sold are introduced by the programmer to simply the programming task. The variable month_count is not effected by the input parameters and thus requires no corresponding inserted gradient code.

For this application, a relationship is used between the unit price, the monthly marketing budget and the number sold which reflects the fact that the greater the marketing budget or the lower the price, the larger the number sold. As an added illustrative factor, the total funds available for the marketing budget is sometimes adjusted upwards, depending on the profit from the preceding month.

This illustrative program is written in the procedural language C and follows the usual convention that text enclosed with the symbols /* and */ are comments, and not a part of the actual program code. The program original will be presented in Listing A, and then in Listing B with inserted gradient code.

---

LISTING A - ORIGINAL PROGRAM

```
/*Parameters*/
float unit_price,
       mth_mktg_bgt;    /*Base monthly marketing budget*/
/*Output*/
float profit;
/*Other variables whose gradients must be tracked*/
float months_profit,
      number_sold;
/*Variable(s) whose gradients need not be tracked*/
int   month_count;
/*Function defined*/
float sq(float x)
{
    return(x*x);
}
main ( )
```

---

-continued

LISTING A - ORIGINAL PROGRAM

```
{
    /*Get parameter values*/
    printf(" n nUnit price ($): ");
    scanf("%f",&unit_price);
    printf(" nBase monthly marketing budget: ");
    scanF("%f",&mth_mktg_bgt);
    months_profit = 0;
    for (month_count = 0; month_count < 12;
    ++month_count)
    {
        /*Variable introduced within this scope only*/
        float emb;    /*effective monthly budget*/
        emb = mth_mkg_bgt
        if (months_profit > 20)
        {
            emb = mth_mktg_bgt + (0.1)*months_profit;
        }
        else
        {
            emb = mth_mktg_bgt;
        }
        number_sold =
            700000    /*maximum, multiplied by two fractions:*/
            *(emb/(emb + 1000)) /*increases with marketing
            budget*/
            *(1/(sq(unit_price) + 1));/*decreases with
            unit_price*/
        months_profit =
            number_sold*unit_price - mth_mktg_bgt;
        profit = profit + months_profit:
        /*accumulate by month*/
    }
    printf(" n Annual profit = %f  n", profit);
}
```

Listing B illustrates the program with the inserted gradient code, that is, the gradient variable declarations and the gradient function assignments comprising the new program code for determining the values of the gradients of the variables of interest. The original program is represented in Listing B by normal, upright characters while the inserted gradient variable declarations and gradient function assignments are indicated in bold italic characters. The gradient variables are represented in conventional notation following the notation previously used, for example, the gradient, or partial derivative, of profit with respect to unit_price appears as D_profit_D_unit_price.

---

LISTING B - PROGRAM WITH INSERTED GRADIENT CODE

```
/*Parameters*/
float unit_price,
       mth_mktg_bgt;    /*Base monthly marketing budget*/
/*Output*/
float profit;
            /*Gradient Variable(s) Declaration(s) Introduced*/
float D_profit_D_unit_price = 0,    /*initially set to zero*/
      D_profit_D_mth_mktg_bgt = 0;
/*Other variables whose gradients must be tracked*/
float months_profit,
      number_sold;
            /*Gradient Variable(s) Declaration(s) Introduced*/
float D_months_profit_D_unit_price = 0,
      D_months_profit_D_mth_mktg_bgt = 0,
      D_number_sold_D_unit_price = 0,
      D_number_sold_D_mth_mktg_bgt = 0;
/*Variable(s) whose gradients need not be tracked*/
int   month_count;
/*Function defined*/
float sq(float x)
{
    return(x*x);
}
main ( )
```

LISTING B - PROGRAM WITH INSERTED GRADIENT CODE

```
{
    /*Get parameter values*/
    printf(" n nUnit price ($): ");
    scanf("%f",&unit_price);
    printf(" nBase monthly marketing budget: ");
    scanF("%f",&mth_mktg_bgt);
    months_profit = 0;
    for (month_count = 0; month_count < 12;
    ++month_count)
    {
        /*Variable introduced within this scope only*/
        float emb;      /*effective monthly budget*/
        /*Gradient Variable(s) Declaration(s) Introduced*/
        float D_emb_D_unit_price = 0,
              D_emb_D_mth_mktg_bgt = 0;
        /*Inserted Gradient Function Assignment Code*/
        D_emb_D_unit_price = 0,
        D_emb_D_mth_mktg_bgt = 1;
        emb = mth_mkg_bgt
        /*The following if (...) statement is not an declaration,
        so that no gradient determination code is required.*/
        if (months_profit > 20)
        {
            /*Inserted Gradient Function Assignment Code*/
            D_emb_D_unit_price =
                (0.1)*D_months_profit_D_unit_price;
            D_emb_D_mth_mktg_bgt = 1 +
                (0.1)*D_months_profit_D_mth_mktg_bgt:
            emb = mth_mktg_bgt + (0.1)*months_profit;
        }
        else
        {
            /*Inserted Gradient Function Assignment Code*/
            D_emb_D_mth_mktg_bgt = 1.0;
            emb = mth_mktg_bgt;
        }
        /*Inserted Gradient Function Asigment Code*/
        D_number_sold_D_unit_price = 700000*
/*deriv w.r.t.*/          ( ( (emb/(emb + 1000))
/*unit_price.*/              *((-2*unit_price)/(sq(unit_price)
  + 1)) )
/*deriv w.r.t.*/          +( (1/(sq(emb + 1000)))
/*emb.*/                     *(1/(sq(unit_price) + 1))
             *D_emb_D_unit_price ) );
        D_number_sold_D_mth_mktg_bgt = 700000*
/*Deriv w.r.t.*/          (1000/(sq(emb + 1000)))
/*emb.*/                     *(1/(sq(unit_price) + 1))
             *D_emb_D_mth_mktg_bgt:
        number_sold =
            700000    /*maximum, multiplied by two fractions:*/
            *(emb/(emb + 1000))  /*increases with marketing budget*/
            *(1/(sq(unit_price) + 1))  /*decreases with unit_price*/
        /*Inserted Gradient Function Assignment Code*/
        D_months_profit_D_unit_price =
/*deriv. w.r.t. unit_price*/       number_sold
/*deriv. w.r.t.*/ + (unit_price*D_number_sold_D_unit_price);
/*number_sold*/
            D_months_profit_D_mth_mktg_bgt =
/*deriv. w.r.t. mth_mkgt_bgt.*/    - 1
                                   +
(unit_price*D_number_sold_D_mth_mktg_bgt);
/*number_sold*/
        months_profit =
            number_sold*unit_price - mth_mktg_bgt;
        /*Inserted Gradient Function Assignment Code*/
        D_profit_D_unit_price =
            D_profit_D_unit_price +
            D_months_profit_D_unit_price;
        D_profit_D_mth_mktg_bgt =
            D_profit_D_mth_mktg_bgt +
            D_months_profit_D_mth_mktg_bgt:
        profit = profit + months_profit:  /*accumulate
          by month*/
    }
    printf(" n Annual profit = %f  n", profit);
    printf(" n Rate of change w.r.t. unit price = %f  n",
        D_profit_D_unit_price);
    printf(" n Rate of change w.r.t. monthly marketing budget =
     %f  n",
```

LISTING B - PROGRAM WITH INSERTED GRADIENT CODE

```
        D_profit_D_mth_mktg_bgt);
```

An examination of Listing B will show that, in accordance with the present invention, each new gradient variable is inserted into the original code just after the original process variable declarations for the parameters and internal variables of which the gradient variable is a function and that the gradient function assignment code is inserted into the original code just before the portion of the original code which operates on the corresponding internal variable. The gradient variable declaration D_profit_D_unit_price, for example, is inserted just after the process variable declaration for profit and the gradient variable declaration for D_months_profit_D_unit_price is inserted just after the process variable declaration for months_profit, unit-price having been assigned at an earlier point in the original code. In further illustration, the gradient function assignment code for D_number_sold_D_unit_price, that is, the code defining the set of processor operations for determining the value of the derivative of number_sold with respect to unit_price, is inserted into the original process code just before the portion of the original process code that determines a value for number_sold as a function of unit-price.

The illustration of the present invention as shown in Listings A and B also illustrated that implementation of the present invention is not dependent the particular form of the process. For example the illustration shown in FIGS. 2A and 2B might well represent the very organized structure of object based programming, wherein each process is structured as a set of objects which contain both the variables used in an object and the functional statements acting on the variables in the object, that is the code performing operations on the object's variables. Listings A and B, however, are more typical of the less rigid structures found in block structured languages such as C, wherein variable assignments statements and function assignments appear in the process where required and the process is not structured into objects. Yet another example is discussed in the following with regard to processes such as a spreadsheet program.

The above illustrations of the present invention demonstrates several features of the present invention that should be noted. First, the present invention operates directly with the code of the actual process, and not with an abstracted model of the process.

The invention further does not require a global understanding of the process, that is, an understanding of the overall or detailed operation or purpose of the process, but only a local understanding of the process, that is, it requires only an understanding of the process at the points where process variable declarations and process function assignments occur.

In addition, the complexity of operations required to determine and insert the gradient variable declarations and gradient function assignments increases only linearly with the complexity of the process.

Finally, it should be noted that, as demonstrated above, each gradient variable is carried through the process together and in parallel with the process variable whose gradient it represents and the value of a gradient variable will change only when the value of the corresponding process variable changes.

3. Generation and Insertion of Gradient Variable Declarations and Gradient Function Statements (FIG. 3)

From the above comments, it is apparent that the present invention may readily and advantageously be implemented as an automated process, thereby avoiding or at least substantially reducing the introduction of errors when determining and inserting the gradient declarations and assignments.

In addition, it is desirable to provide the above described process for determining the gradient of output variables with respect to input parameters as a user selectable utility in applications programs, such as a spreadsheet program, which are intended for use by users who are not programmers. A spreadsheet program, for example, is a program for creating programs, wherein each individual spreadsheet created by a user is, in fact, a program for performing spreadsheet operations determined by the user. The spreadsheet program provides the user with facilities to generate a set of CMs 22 having user defined PVDs 24 for input parameters provided by the user or as outputs of other CMs 22 and user defined PFA 26 to perform the desired spreadsheet calculation functions. The user is not expected to be a programmer, but rather an accountant or business manager, and the spreadsheet program thereby presents these program generation facilities in terms of financial spreadsheet idioms, rather than as programming functions.

FIG. 3 illustrates the means and processes by which the above described process for determining, assigning and inserting gradient variables and gradient determination functions into a program may, according to the present invention, be performed by a system such as illustrated in FIG. 1. It will be noted that, in this example, the "data" provided to a Processor Unit 4 by a Data Source 6 is the original program to which the gradient determination function is to be added, that the output provided will be the program with gradient variables and gradient determination functions inserted. The process described with reference to FIG. 1 will be executed by Processor Unit 4 under control of a gradient process, or program, stored in Control Unit 8, the steps or operations of the gradient program being determined by the process illustrated in FIG. 3.

The process illustrated in FIG. 3 operates on Original Program 32 and begins with Variable Parser 34, which scans, or reads, and parses the process variable declarations and process function assignments of Program 32 to identify all variables which may be of interest, that is, user visible variables whose value can be affected by the values of the input parameters of interest. Parser 34 also determines and records the locations of the process variable declarations and process function assignments in Original Program 32.

The variables of interest are provided to Variable Select 36 which, for example, may be a means for displaying the variables located and identified by Variable Parser 34 to a user and allowing the user to indicate which variables are of interest to the user. It should be noted that the construction and operation of parsers such as Parser 34 are well understood by those of ordinary skill in the art, being a common function, for example, of compilers, so that Parser 34 need not be discussed in further detail.

Having determined the process variables of interest, Generate Gradient Variable Declarations (Generate GVD) 38 will generate, for each process variable of interest, one or more corresponding gradient variable declarations conforming to the syntax of Program 32.

Gradient Functions 40 will then, for each gradient function corresponding to a selected process variable of interest, one or more corresponding gradient function assignments comprising the code determining the values of the gradient variable as a function of the variables effecting the value of the corresponding process variable of interest. In this regard, each process variable of interest will be a function of one or more other process variables, which may be either input parameters or internal variables. An essential function of Gradient Functions 40 is thereby the determination of the derivatives of the original Program 32 functions of the variables of interest with respect to the process variables appearing in those functions, as has been discussed and illustrated previously. Programs for determining the derivatives of functions, however, are well known in the art, often being available as utilities to mathematical and mathematical tutorial programs, and the methods for adding such functions for finding the derivatives of functions to the parsing and compiling functions illustrated in FIG. 3 will be obvious to those of ordinary skill in the art after reading this description of the present invention.

File Editor 42 will receive the program code comprising the gradient declarations from Generate GVD 38 and the program code comprising gradient function assignments from Gradient Functions 40 and the information identifying the locations in Original Program 32 of the corresponding process variable declarations and corresponding process function assignments and will insert, or write, the gradient variable declarations and gradient function assignments into Original Program 32 at the locations determined according to the present invention, as has been previously described. The operation and structure of a File Editor 42 will be apparent to one of ordinary skill in the art after reading the present description, and will therefore not be discussed further.

It should be noted, however, that the operations performed by Gradient Functions 40 and File Editor 42 will further depend, in part, on the amount of information regarding the process variables of interest and corresponding process function assignment that has been obtained and retained by Parser 34. As described above, Parser 34 will scan and parse the process variable assignment and function assignments of Program 32 to identify the variables of possible interest. It is generally a more efficient embodiment of the present invention if, as described above, Parser 34 determines and retains the process function assignments of Original Program 32 and the locations in Original Program 32 of both the process variable declarations and the corresponding process function assignments and provides this information to Gradient Functions 40 and File Editor 42. Gradient Functions 40 and File Editor 42 may then use this information, without the need for further scanning and parsing of Program 32, to generate the gradient function assignments and to insert the gradient variable declarations and gradient functions statements into Program 32. If Parser 34 has not determined or retained this information, or does not have this information in complete form, then Gradient Functions 40 must again scan and parse the process variable declarations and process function assignments of Program 32 to determine the process functions of the variables of interests and their locations in Program 32; this approach, however, may be preferable in certain circumstances.

The final result from the operations of Parser 34, Generate GVD 38 and Gradient Functions 40, and File Editor 42 will be a Gradient Determination Modified Program 44, which is a version of original Program 32 with the gradient variable declarations and gradient function assignments inserted according to the present invention.

It should be noted that the operations described above with respect to FIG. 3 may be performed as a pre-compilation operation on source code, as a part of the compilation of source code, upon object code as a post compilation operation, or as a user available utility in many applications programs, such as spreadsheets. Examples of various applications of the present invention will be discussed below, after a discussion of certain further considerations in the implementation of the present invention.

C. Further Implementations of the Invention

1. Higher Order Derivatives

It is often of interest to a user of a system to determine the rates of change of the rates of change of the variables of interest with respect to the parameters of interest, that is, to determine the "second derivatives" of the functions of the variables of interest. This is easily performed according to the present invention in a manner exactly analogous to the process described above. One approach is to directly determine the second derivatives of the functions of the variables of interest in the same manner as described above, that is, and for example as in the operations of Gradient Functions 40, to determine the second derivatives of the functions rather than the first derivatives, or to determine both the first and second derivatives. An alternate approach, which is convenient and requires less complexity on the part of Gradient Functions 40, is to perform the process described above to determine the first derivatives of the variables of interest and then to repeat the process, using as the variables of interest in the second iteration the gradient variables determined in the first iteration. The first iteration will provide the first derivatives of the variables of interest and the second iteration will provide the first derivatives of the first derivatives, that is, the second derivatives, of the variables of interest.

This process of determining higher order derivatives may be repeated indefinitely to provide third order and fourth order derivatives, and so on. A significant use for such higher order derivatives would be the approximation of a function defined by the program as a Taylor series. By this means, the complete effect of the program around each choice of input parameters could be determined by a function which may be computed relatively rapidly.

2. Gradients With Respect To Internal Variables

Further, it should be noted that the present invention is not limited to determining the rates of change only of variables with respect to input parameters. While the determination of the rate of change of variables with respect to input parameters will generally be the primary interest of a user because the input parameters may be directly controlled by the user or by other parts of a system, many variables are functions of other internal variables rather than direct functions of input parameters. It may be of interest to a user of the system to monitor the rate of change of chosen variables with respect to other internal variables.

This may be achieved in exactly the manner described above by simply substituting the internal variable with respect to which the rate of change of a variable of interest is to be determined for the input parameter(s) of the above descriptions and in all other respects following the process described above. The user may then control the variables of interest indirectly, by controlling the input parameters to the accessible internal variables whose values in turn effect the variables of interest.

It is necessary, however, to meet the previously discussed requirement that the process in itself not interfere with the determination of the values of gradient variable. That is, it is necessary that a process function assignment and the corresponding gradient function assignments operate with the same values for the variables appearing in the functions defined in the process and gradient function assignments. In this respect, the internal variables with respect to which the gradient of a variable of interest is being determined must operate as "local" parameters, that is, they must appear locally as quantities whose values do not change during the execution of the local process and gradient function assignments.

3. "Continuous" Parameters

It should be further noted that, as is apparent from consideration of the above discussion of the present invention, the present invention operates with respect to the actual variables and functions of the process whose variable gradients are to be determined. It is also apparent that the system of the present invention determines the gradients of variables of interest through the derivatives of the functions operation on the variables. The present system thereby is inherently capable of operating with continuous variables and functions of variables and indeed inherently assumes that the variables are "continuous". The meaning, therefore, of "continuous" must be considered when applying the means and methods of the present invention to determine the rates of change of variables with respect to other variables, whether input parameters or internal variables.

First, continuous parameters, or input values, refers to parameters which can effectively take any value which is "close" to the values usually chosen for execution of the process. The term "close", however, means values which are not invalid or unreasonable when considering the range of values of an input variable that the process is intended to operate with. For example, in a program which concerns spacing between airplanes in flight, the minimum permissible distance between aircraft is a continuous parameter. If the program is designed and usually used with this parameter having a value of five miles, then this parameter may be set to any distance which is "close" to five miles but, in this example, "close" means that values such as 1, 2, 10 or 100 miles may be regarded as "close". A value of $-3.1$ miles, however, is not "close" because the program was not intended to handle such values as $-3.1$ miles for separation between aircraft, that is, a value of $-3.1$ miles is invalid within the context of the program. The term "close" may also be understood to mean a range of input parameter values which do not cross discontinuities in the functions operating on or with the input parameters.

Further, either the program itself or the computer system may effect the meaning of the term "continuous". For example, if a parameter represents the percentage of aircraft seats occupied, and there are 170 seats, then not every percentage between 0 and 100 are or can be represented, but only 170 of the possible numbers in the range of 0 to 100. In yet another example, the inherent limitations of computer memory and ability of a computer system to represent numeric values will define a minimum "granularity" on the representation of data values, even, for example, using double precision floating point representation, which is non-continuous at some level. For these reasons, the terms "effectively" and "close" mean that not every possible value of parameter of variable can be dealt with, in theory, but can be in practice, so that a "continuous" variable or function means continuous in practice.

D. Implementations In Process Environments

1. Process Control Systems

It is very common for program controlled processor systems such as that illustrated in FIG. 1 to be used to control processes and handle transactions, for example, in the control of engines and machinery, industrial, chemical and biological processes, allocation and management of computer system resources, such as disk drive and memory space, and all forms of feedback control systems, such as found in aircraft, ships and vehicles. Examples of transaction processes would include the handling of database entries and the handling of messages in an electronic communications network.

The program control units of such process control systems all include some means for providing parameters which are set for a given execution of the process control program, and some means for executing operations on the parameters and on internal variables to provide a result which is of use to the user or users of the system. Such parameters may include the speed of a conveyer belt in a chemical process, the fraction of disk space allocated to each user in a database system, or the fraction of communications requests that are denied in a communications network.

It should be noted that a "fixed" parameter is defined as "fixed" for a given execution of the process control program, not as fixed for all time, and that a given parameter will in fact generally vary in time. A parameter may thereby appear as "fixed" for the purposes of a given execution of the process control program either because the process control program executes sufficiently faster than the variance of the parameter with time that the parameter appears not to vary from the point of view of an execution of the process, or because the value of the parameter is sampled at given points in time and the value of the sample presented to the system as the parameter, or both.

In all of these systems, a value is usually picked for the parameters based upon experience and what is desired is to be able to alter these parameter valued based upon the actual performance of the system so as to optimize some variable, that is, output, of interest, such as average elapsed time of a transaction or tons of chemical X produced per day.

The control program of the system then has the parameter(s) of interest as inputs and the variable(s) of interest as outputs and new gradient variable(s) and gradient determination function(s) are inserted into the control program as described herein. The output of the gradient determination function(s) is the rate of change of the variable of interest with respect to the input parameter of interest and may be used, directly or indirectly, as under the control of system user, to increase or decrease the values of the input parameter(s) accordingly to optimize the value of the variable of interest.

It should be noted that there are several factors to consider when using the means and methods of the present invention is a process control system. For example, the execution of the gradient variable declarations and gradient determination functions requires additional computation time and additional space in system memory. If these additional demands on the system are relatively insignificant to the performance of the process control system, the modified form of the process control program may be run permanently. If the additional demands on the system are unacceptable, the modified version of the process control program may be run off-line, that is, separately from the unmodified form of the process control program, which is used to actually control the program. The modified form of the process control program may be run in parallel with the actual process control program, or at a separate time, and using actual data captured from the operation of the process to give parameter values to improve the performance of the process system. This second approach, however, has the disadvantage that the parameter updates are not as timely as when the modified form of the process control program is used directly to control the process.

2. Simulation Systems

As is well known in the art, simulation systems are characteristically implemented as processes, that is, programs executing on computer systems such as illustrated in FIG. 1 which emulate "real" systems and, in this respect, can emulate virtually any form of system, from aircraft wing designs, to ship hull designs, to vehicle control systems and vehicles themselves, to industrial and chemical processes, and to biological and financial systems. As such, the means and methods of the present invention are directly applicable to simulation systems and may be used to guide the designs of the systems emulated by finding the input parameter or parameters, and indirectly the elements in the emulated system generating the input parameters to the simulation program, which will provide the optimum performance of the emulated system.

Most simulations are often further characterized by the use of probability distributions of values, such as the Monte Carlo processes, to represent the input parameters, thereby mimicking events occurring in the "real" world. The methods for generating such probability distributions of input values are well known and result in sequences of random numbers to be used as input parameter values. Each execution of the simulation process is thereby associated with a sequence of random number value input parameters and the sequence of random number input parameters is treated as a sequence of "fixed", or constant, values.

The means and methods of the present invention, when applied to a simulation using a sequence of random number values as input parameters is to produce the exact rates of changes of outputs, that is, of the variables of interest, with exactly the sequence of random number values provided as parameter inputs to the simulation program. This is a useful result for many, if not most, practical requirements and has the advantage of providing a result which can be described exactly. The statistical properties of the simulation can then be further elaborated as desired.

It should be noted that, for practical simulations, further statistical properties, such as variance, of regular simulation executions are themselves difficult, if not practically impossible to derive. Simulations are therefore frequently run only a few times, or even only once, and the results accepted as approximating the true results, with unknown statistical distribution, and a simulation modified according to the present invention would be dealt with in the same manner.

3. Adaptations to Different Programming Styles or Methodologies

As has been described, the means and methods of the present invention for determining the gradients of variables of interest in a process depends on the recognition and utilization of only two elements in computer programs, that is, variables and program functional statements which change the values of variables. These elements are recognizable in all styles or methodologies of programming, including procedural languages such as C, FORTRAN and Cobol, and object oriented programming languages such as C++, in functional programming, and in applications oriented programming, such as spreadsheets. The following will describe the implementations of the present invention in certain programming styles and methodologies of common interest.

a. Spreadsheet Programs

First considering spreadsheet programs, as was described above a spreadsheet application program is essentially is a program for creating programs, wherein each individual spreadsheet created by a user is a program for performing spreadsheet operations determined by the user. The spreadsheet program provides the user with facilities to generate a set of program control modules, such as CMs 22. Each spreadsheet program control module created by the user will have user defined input parameters, which may be provided by the user or provided as outputs of other spreadsheet program control modules, and user defined program control functions, that is, operations or sets of operations on the parameters, to perform the desired spreadsheet calculations and generate the desired outputs.

In conventional spreadsheet terms, each spreadsheet program has "input cells" whose values must be supplied by the user, and "non-input cells", whose values are calculated as a result of values of the input cells according to functions determined by the user. For example, a manager may have developed a spreadsheet which is designed to compute the profit based on external sale price and internal transfer price for selling units within a company. The latter two variables would be represented by input cells and profit would be represented by a non-input cell and, among all input cells, the manager would be most interested in the profit cell.

The present invention is implemented in a spreadsheet type program by creating a separate area, or its equivalent, equal in size to the original spreadsheet, for each of the parameters of interest. In the above example, therefore, the user could create two separate areas and, in each of these areas, fill the cells as follows. Alternately, the user could create new sets of cells within the original spreadsheet area for each of the parameters of interest, again filling the cells as follows. For simplicity and clarity of presentation, it is assumed in the following that the user has created new separate areas for each parameter, rather than the equivalents within the original spreadsheet area.

Considering an area created for input cell X, each non-input cell therein thus corresponds to a function $f(X, P_1, P_2, \ldots, P_m, c_1, c_2, \ldots, c_n)$ where X is the parameter of interest, $P_1, P_2, \ldots, P_m$ are the remaining parameters, and $c_1, c_2, \ldots, c_n$ are non-input cells from the original spreadsheet. Each corresponding cell in the new area for input cell X is replaced by a quantity $D_fD_X$, which is obtained as follows:

$$D_fD_X \rightarrow f_x() + f_{c1}()D_{c1}D_X + f_{c2}()D_{c2}D_X + \ldots + f_{cn}()D_{cn}D_X,$$

which is essentially the same expression as previously described and wherein once again $f_z$ represents the gradient, or partial derivative, or f with respect to z. The cell corresponding to X is then filled with one, and the cells corresponding to the remaining parameters are filled with zero, again as previously described.

It should be noted that the "process function assignments" appearing in the original spreadsheet are spreadsheet formulas, as are well known to those familiar with spreadsheet programs, and that the "gradient function assignments" are similarly spreadsheet formulas, but determined by determining the partial derivatives of the "process functions assignment" formulas of the original spreadsheet.

This is illustrated for a simple example in FIG. 4. As is well understood by those of ordinary skill in the art, the Control Unit 8 of a system for executing a spreadsheet will include, in addition to the spreadsheet program itself, which is not shown in FIG. 4 for purposes of clarity, a Process Control Area 46 for storing the cells comprising the actual spreadsheet being executed by the spreadsheet process. These cells are analogous to the process variable statements and process functions statements discussed previously and define the parameters, variables, and operations performed on the parameters and variables to execute the spreadsheet operation. It should be noted that, in a spreadsheet type of program, each cell of the spreadsheet in itself defines a variable of the spreadsheet process, so that each cell in itself operates as a variable declaration. The contents of each cell operates as a function assignment to define the set of operations to determine the value of the variable represented by the cell. In certain instances the contents of a cell will define the variable represented by the cell to be an input parameter and the corresponding set of operations will call for an input parameter value to be entered for the cell. Other cells will represent internal variables of spreadsheet, that is, variables whose value is dependent upon the values of other variables, including input parameters, and is determined by a set of operations on those other variables as defined by the contents of the cell.

As indicated, the cells of Process Control Area 46 includes Input Cells 48, which will represent input parameters to the spreadsheet process, and Internal Cells 50, which define internal variables of the process and the set of operations to be performed with respect to other variables of the spreadsheet to determine the value of the internal variable represented by the cell. The example illustrated in FIG. 4 is simple for purposes of clarity and contains two Process Input Cells 48$x$ and 48$y$ and one Process Internal Cell 50, wherein Process Input Cell 48$x$ represents input parameter $P_X$ and Process Input Cell 48$y$ represents input parameter $P_Y$ and Process Internal Cell 50 represents a variable f which is a function of input parameters X and Y, expressed as $f(X,Y)$.

According to the present invention, and as described above, a Gradient Control Area 52 equivalent to Process Control Area 46 is created for each input parameter of interest, so that in the present example there will be a Gradient Control Area 52x corresponding to input parameter $P_X$ and a Gradient Control Area 52y corresponding to input parameter $P_Y$. Variable f of interest is a function of both input parameter $P_X$ and input parameter $P_Y$, so that Gradient Control Areas 52x and 52y will each contain a Gradient Input Cell 54x corresponding to $P_X$ and a Gradient Input Cell 54y corresponding to $P_Y$.

Gradient Control Area 52x will contain a Gradient Internal Variable Cell 56x representing a gradient internal variable whose value is the gradient of f(X,Y) with respect to $P_X$ and whose contents contain the set of operations necessary to determine $D_f D_X$. Gradient Control Area 52x will correspondingly contain a Gradient Internal Variable Cell 56y representing a gradient internal variable whose value is the gradient of f(X,Y) with respect to $P_Y$ and whose contents contain the set of operations necessary to determine $D_f D_Y$. Gradient Control Areas 52x and 52y will be initialized as described previously, with the cells for $P_X$ in Area 52x and for $P_Y$ in Area 52y, being initially set at 1 and all other cells set at 0.

The system executing the spreadsheet process will execute the processes defined by the cells in both Process Control Area 46 and Gradient Control Areas 52x and 52y, thereby producing not only the results of the original spreadsheet process but also the gradients of f(X,Y) with respect to $P_X$ and $P_Y$, which may be utilized as discussed elsewhere herein.

The process variable gradient information with respect to input parameters which is generated by the cells of the new gradient determination area of the spreadsheet may be displayed to a user of the spreadsheet program through a User Display 10. The user may then use this gradient information and, acting through Input Devices 12, vary or change the values of the input parameters of interest so that the results of the spreadsheet process are driven towards an optimum result desired by the user.

Alternately, the user of the spreadsheet program may define yet further cells, perhaps in yet another new area of the spreadsheet, which accept the gradient variable values as input data and which perform operations on the gradient variable values to generate new input parameters of interest to the spreadsheet process, so that the spreadsheet process is automatically driven to the optimum result desired by the user.

Finally, FIG. 5 illustrates a means and method for modifying a spreadsheet process to allow the determination of the gradient of selected variables of interest with respect to input parameters of interest. As indicated therein, the process begins with a Cell Reader 58 which reads the Input Cells 48 and Internal Cells 50 of a Process Control Area 46 and, operating with a Variable Select 60, which will usually be implemented as a User Display 10 for presenting the possible variables and input parameters of interest with an Input Device 12 through which a user indicates the variables and parameters of interest, selects the input parameters and internal variables of interest.

The information generated by Cell Reader 58 and Variable Select 60 will be provided to a Gradient Control Generator 62, which will generate a Gradient Control Area 52 for each input parameter of interest. A cell Generator 64, operating in conjunction with Gradient Control Generator 62 and the information provided by Cell Reader 58 and Variable Select 60 will then write Gradient Input Cells 54 and Gradient Internal Variable Cells 56 into each Gradient Control Area 52 as described above. It should be noted that Cell Generator 64 will most probably the element which performs the derivation operations necessary to determine the functions $D_F D_Z$ to determine the gradients of the variables of interest with respect to the parameters of interest, as was discussed previous with reference to Gradient Functions 40 of FIG. 3.

b. Object-Oriented Programs

Object oriented programming is characterized by the use of "object", which may very generally be described as self-contained program entities or modules wherein any variables used in an object are defined and altered, that is, operated upon or with, within the object. It is apparent, therefore, that the means and methods of the present invention may be applied directly to object oriented programs since they are local to the occurrences in the object based program where the variables and variable changes occur. Gradient information will be maintained consistently by such objected mechanisms as are inherited.

While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. A system for monitoring a process, comprising:
   a process control means, including
      a process variable assignment means for providing at least one process variable declaration, each process variable declaration defining a corresponding process variable, at least one of the process variables being a variable of interest and each variable of interest having a value affected by at least one parameter, and
      a process function means for providing at least one process function assignment, each process function assignment being associated with a process variable and defining a set of operations to determine a value of the corresponding process variable, and
   a gradient monitoring means, including
      a gradient variable means for providing at least one gradient variable declaration,
         each gradient variable declaration corresponding to a process variable of interest and defining a gradient variable representing the gradient of the corresponding process variable of interest with respect to a parameter affecting the value of the process variable of interest, and
      a gradient function means for providing at least one gradient function assignment for each occurrence of a process function assignment associated with a process variable,
         each gradient function assignment corresponding to a gradient variable corresponding to the process variable associated with the process function assignment and defining a set of operations for determining the value of the corresponding gradient variable, and a processor means responsive to each gradient variable declaration and to each corresponding gradient function assignment for determining a value of each gradient variable and providing an output representing the value of each gradient variable.

2. The system for monitoring a process of claim 1, wherein:

at least one of the parameters is an input parameter, and at least one of the parameters with respect to which the gradient of the process variable of interest is to be determined is an input parameter.

3. The system for monitoring a process of claim 2, wherein the system further comprises:

means responsive to the value of a gradient variable output representing the gradient of a corresponding process variable of interest for changing the value of an input parameter effecting the value of the process variable of interest in a manner to drive the process variable of interest to an optimum value.

4. The system for monitoring a process of claim 1, wherein:

each process function assignment defines the value of the corresponding process variable as an assigned function of other variables, which include at least one parameter, and each gradient function assignment defines the value of the corresponding gradient variable as a sum of a partial derivative of the assigned function with respect to a parameter summed with the summation, over all variables, of the products of the partial derivatives of the variable of interest with respect to the other variable which occur in the assigned functions and the partial derivative of the assigned function with respect to each of the variables.

5. The system for monitoring a process of claim 1, wherein:

each gradient function assignment is executed before a corresponding process function assignment operating on the corresponding process variable of interest.

6. In a system for monitoring a process, including a process control means, including a process variable assignment means for providing at least one process variable declaration, each process variable declaration defining a corresponding process variable, at least one of the process variables being a variable of interest and each variable of interest having a value affected by at least one parameter, and a process function means for providing at least one process function assignment, each process function assignment being associated with a process variable and defining a set of operations to determine a value of the corresponding process variable, and a processor means responsive to each process declaration and to each process function assignment for determining the values of the corresponding process variables, a gradient means for determining the gradient of a process variable with respect to parameters effecting the value of the process variable, comprising:

a gradient monitoring means, including a gradient variable means for providing at least one gradient variable declaration, each gradient variable declaration corresponding to a process variable of interest and defining a gradient variable representing the gradient of the corresponding process variable of interest with respect to a parameter affecting the value of the process variable of interest, and a gradient function means for providing at least one gradient function assignment for each occurrence of a process function assignment associated with a process variable, each gradient function assignment corresponding to a gradient variable corresponding to the process variable associated with the process function assignment and defining a set of operations for determining the value of the corresponding gradient variable, wherein the processor means is responsive to each gradient variable declaration and to each gradient function assignment for determining the value of each gradient variable and providing an output representing the gradient of the corresponding variable of interest.

7. The system for monitoring a process of claim 6, wherein:

at least one of the parameters is an input parameter, and at least one of the parameters with respect to which the gradient of the process variable of interest is to be determined is an input parameter.

8. The system for monitoring a process of claim 7, wherein the system further comprises:

means responsive to the value of a gradient variable output representing the gradient of a corresponding process variable of interest for changing the value of an input parameter effecting the value of the process variable of interest in a manner to drive the process variable of interest to an optimum value.

9. The system for monitoring a process of claim 6, wherein:

each process function assignment defines the value of the corresponding process variable as an assigned function of other variables, which include at least one parameter, and each gradient function assignment defines the value of the corresponding gradient variable as a sum of a partial derivative of the assigned function with respect to a parameter summed with the summation, over all variables, of the products of the partial derivatives of the variable of interest with respect to the other variable which occur in the assigned functions and the partial derivative of the assigned function with respect to each of the variables.

10. The system for monitoring a process of claim 6, wherein:

each gradient function assignment is executed before a corresponding process function assignment operating on the corresponding process variable of interest.

11. Means for monitoring a process executed by a system to allow a determination of a gradient of a variable of interest of the process with respect to a parameter of the process, the process including at least one process variable declaration, each process variable declaration defining a corresponding process variable, at least one of the process variables being a variable of interest and each variable of interest having a value affected by at least one parameter, and at least one process function assignment, each process function assignment being associated with a process variable and defining a set of operations to determine a value of the corresponding process variable, the process monitoring means comprising:

a parser for reading from the process each process variable declaration and each process function assignment of the process, and determining the location of each process variable declaration and each process function assignment of the process, a gradient variable means responsive to the process variable declarations read by the parser means for generating gradient variable declarations, each gradient variable declaration corresponding to a process variable of interest and defining a gradient variable representing the gradient of the corresponding process variable of interest with respect to a parameter affecting the value of the corresponding process variable, and a gradient function means responsive to each occurrence of a process function assignment associated with a process variable of interest read by the parser means for deriving a gradient function assignment from each process function assignment of the process variable of interest, each gradient function assignment corresponding to a gradient variable corresponding to the process variable associated with the process function assignment and defining a set of operations for determining the value of the corresponding gradient variable, and a file editor means for modifying the process by inserting each gradient variable declaration and each gradient function assignment into a process control means, wherein the process control means is responsive to each gradient variable declaration and to each corresponding gradient function assignment for determining a value of each gradient variable.

12. The means for monitoring a process executed by a system to allow the determination of the gradient of a variable of interest of the process with respect to a parameter of the process of claim 11, wherein:

at least one of the parameters is an input parameter, and at least one of the parameters with respect to which the gradient of the process variable of interest is to be determined is an input parameter.

13. The means for monitoring a process executed by a system to allow the determination of the gradient of a variable of interest of the process with respect to a parameter of the process of claim 11, wherein:

each gradient function assignment is executed before a corresponding process function assignment operating on the corresponding process variable of interest.

14. The means for monitoring a process executed by a system to allow the determination of the gradient of a variable of interest of the process with respect to a parameter of the process of claim 11, wherein:

each process function assignment defines the value of the corresponding process variable as an assigned function of other variables, which include at least one parameter, and each gradient function assignment defines the value of the corresponding gradient variable as the sum of the partial derivative of the assigned function with respect to the parameter summed with the summation, over all variables, of the products of the partial derivatives of the variable of interest with respect to the other variable which occur in the assigned functions and the partial derivative of the assigned function with respect to each of the variables.

15. In a system for monitoring a process, including a process control means, including a process variable assignment means for providing at least one process variable declaration, each process variable declaration defining a corresponding process variable, at least one of the process variables being a variable of interest and each variable of interest having a value affected by at least one parameter, and a process function means for providing at least one process function assignment, each process function assignment being associated with a process variable and defining a set of operations to determine a value of the corresponding process variable, a method for determining the gradient of a process variable with respect to a parameter affecting the value of the process variable, comprising the steps of:

providing at least one gradient variable declaration, each gradient variable declaration corresponding to a process variable of interest and defining a gradient variable representing the gradient of the corresponding process variable of interest with respect to a parameter affecting the value of the process variable of interest, and providing at least one gradient function assignment for each occurrence of a process function assignment associated with a process variable, each gradient function assignment corresponding to a gradient variable corresponding to the process variable associated with the process function assignment and defining a set of operations for determining the value of the corresponding gradient variable, and for each gradient variable declaration and for each gradient function assignment, determining the value of each gradient variable, and providing an output representing the gradient of the corresponding variable of interest.

16. A method for monitoring a process executed by a system to allow a determination of a gradient of a variable of interest of the process with respect to a parameter of the process, the process including at least one process variable declaration, each process variable declaration defining a corresponding process variable, at least one of the process variables being a variable of interest and each variable of interest having a value affected by at least one parameter, and at least one process function assignment, each process function assignment being associated with a process variable and defining a set of operations to determine a value of the corresponding process variable, the method for monitoring a process executed by a system to allow the determination of the gradient of a variable of interest of the process with respect to a parameter of the process, comprising the steps of:

reading from the process each process declaration and each process function assignment of the process, and determining a location of each process declaration and each process function assignment of the process, the process variable declarations,
generating gradient variable declarations,
each gradient variable declaration corresponding to a process variable of interest and defining a gradient variable representing the gradient of the corresponding process variable of interest with respect to a parameter affecting the value of the corresponding process variable, and responsive to each occurrence of a process function assignment associated with a process variable of interest read by the parser means,
deriving a gradient function assignment from each process function assignment of the process variable of interest,
each gradient function assignment corresponding to a gradient variable corresponding to the process variable associated with the process function assignment and defining a set of operations for determining the value of the corresponding gradient variable, and responsive the location of each process declaration and each process function assignment provided by the parser means,
inserting each gradient variable declaration and each gradient function assignment into the process, and for each gradient variable declaration and for each corresponding gradient function assignment determining the value of the corresponding gradient variable and providing an output representing the gradient of the corresponding variable of interest.

17. A system for monitoring a spreadsheet process, comprising:

a control means, including
a process area control means, including
a plurality of process cells, each of the process cells defining a process variable of the spreadsheet process,
at least one of the process cells being a process input cell defining a corresponding process variable which is an input parameter to the spreadsheet,
at least one of the process cells being a process internal cell defining an internal variable of the spreadsheet process, and
defining a set of operations to determine the value of the corresponding process internal variable with respect to at least one parameter, wherein
the value of at least one of the internal variables is determined by the value of at least one corresponding input parameter, and
wherein at least one of the internal variables having a value effected by a corresponding input parameter is a process internal variable of interest and
the corresponding parameters effecting the values of the process internal variables of interest are parameters of interest, and for each parameter of interest,
a gradient area control means, including
a plurality of gradient cells,
at least one of the gradient cells being a gradient input cell corresponding to a process input cell and defining a corresponding gradient variable corresponding to the process input parameter,
at least one of the gradient cells is a gradient internal cell defining a gradient internal variable corresponding to a process internal variable, and
defining a set of operations to determine the value of the gradient of the corresponding process internal variable with respect to the input parameter corresponding to the gradient area control means, and a processor means responsive to each gradient internal variable cell for determining the value of the corresponding gradient internal variable of interest and providing an output representing the gradient of the corresponding process variable of interest.

18. In a system for monitoring a spreadsheet process, the system including a process area control means, including
a plurality of process cells, each of the process cells defining a process variable of the spreadsheet process,
at least one of the process cells being a process input cell defining a corresponding process variable which is an parameter to the spreadsheet,
at least one of the process cells being a process internal cell defining an internal variable of the spreadsheet process, and
defining a set of operations to determine the value of the corresponding process internal variable with respect to at least one parameter, wherein
the value of at least one of the internal variables is determined by the value of at least one corresponding parameter, and
wherein at least one of the internal variables having a value effected by a corresponding parameters is a process internal variable of interest and
the corresponding input parameters effecting the values of the process internal variables of interest are parameters of interest, and a processor means responsive to each process input cell and to each process internal variable cell for determining the value of the corresponding process internal variables, a means for determining the gradient of process internal variables of interest with respect to corresponding parameter of interest, comprising:
for each process parameter of interest,
a gradient area control means, including a plurality of gradient cells,
  at least one of the gradient cells is a gradient input cell corresponding to a process input cell and defining a corresponding gradient variable corresponding to the process parameter,
  at least one of the gradient cells is a gradient internal cell defining a gradient internal variable corresponding to a process internal variable, and
    defining a set of operations to determine the value of the gradient of the corresponding process internal variable with respect to the parameter corresponding to the gradient area control means, wherein
the processor means is responsive to each gradient internal variable cell for determining the value of the corresponding gradient internal variable of interest and providing an output representing the gradient of the corresponding process variable of interest.

19. A means for monitoring a spreadsheet process executed by a system to allow a determination of a gradient of a variable of interest of the process with respect to another variable of the process,
the system including
  a process control means, including
    a process control area for storing a plurality of process cells, each of the process cells defining a process variable of the spreadsheet process,
      at least one of the process cells is a process input cell defining a corresponding process variable which is an parameter to the spreadsheet,
      at least one of the process cells is a process internal cell defining an internal variable of the spreadsheet process, and
        defining a set of operations to determine the value of the corresponding process internal variable with respect to at least one parameter, wherein
        the value of at least one of the internal variables is determined by the value of at least one corresponding parameter, and
      wherein at least one of the internal variables having a value effected by a corresponding parameters is a process internal variable of interest and
        the corresponding parameters effecting the values of the process internal variables of interest are parameters of interest, and
  a processor means responsive to each process input cell and to each process internal variable cell for determining the value of the corresponding process internal variables,
the means for monitoring a spreadsheet process executed by a system to allow the determination of the gradient of a variable of interest of the process with respect to a parameter of the process comprising:
a means for reading each of the process cells of the process control area means, and
  selecting each parameter of interest and each process internal variable of interest,
gradient control area generating means responsive to the reading means for generating, for each parameter of interest, a gradient control area for storing a plurality of gradient cells, and
  in each gradient control area corresponding to a parameter of interest, at least one of the gradient cells is a gradient input cell corresponding to a process input cell and defining a corresponding gradient variable corresponding to the process parameter,
at least one of the gradient cells is a gradient internal cell defining a gradient internal variable corresponding to a process internal variable, and
  defining a set of operations to determine the value of the gradient of the corresponding process internal variable with respect to the parameter corresponding to the gradient area control means, wherein
the processor means is responsive to each gradient internal variable cell of a gradient control area corresponding to a parameter of interest for determining the value of the corresponding gradient internal variable of interest and providing an output representing the gradient of a corresponding process variable of interest.

20. In a system for monitoring a spreadsheet process, the system including
a process area control means, including
  a plurality of process cells, each of the process cells defining a process variable of the spreadsheet process,
    at least one of the process cells is a process input cell defining a corresponding process variable which is an input parameter to the spreadsheet,
    at least one of the process cells is a process internal cell defining an internal variable of the spreadsheet process, and
      defining a set of operations to determine the value of the corresponding process internal variable with respect to at least one parameter, wherein
      the value of certain of the internal variables is determined by the value of at least one corresponding parameter, and
    wherein at least one of the internal variables having a value effected by a corresponding input parameter is a process internal variable of interest and
      the corresponding input parameters effecting the values of the process internal variables of interest are parameters of interest, and
a processor means responsive to each process input cell and to each process internal variable cell for determining the value of the corresponding process internal variables,
a method for determining a gradient of at least one process internal variable of interest with respect to at least one corresponding parameter of interest, comprising the steps of:
providing, for each process parameter of interest,
  a gradient control area, and
    in each gradient control area, providing
      a plurality of gradient cells, wherein
      at least one of the gradient cells is a gradient input cell corresponding to a process input cell and defining a corresponding gradient variable corresponding to the process parameter, and
      at least one of gradient cells is a gradient internal cell defining a gradient internal variable corresponding to a process internal variable, and
      in each gradient internal cell,
        defining a set of operations to determine a value of the gradient of the corresponding process internal variable with respect to the parameter corresponding to the gradient area control means, and for each gradient internal variable cell determining the value of the corresponding gradient internal variable of interest and providing an output representing the gradient of the corresponding process variable of interest.

21. In a system for monitoring a spreadsheet process, the system including a process control means, including
  a process control area for storing a plurality of process cells, each of the process cells defining a process variable of the spreadsheet process,
    at least one of the process cells being a process input cell defining a corresponding process variable which is an parameter to the spreadsheet,
    at least one of the process cells being a process internal cell defining an internal variable of the spreadsheet process, and
      defining a set of operations to determine the value of the corresponding process internal variable with respect to at least one parameter, wherein
      the value of at least one of the internal variables is determined by the value of at least one corresponding parameter, and
    wherein at least one of the internal variables having a value effected by a corresponding parameter is a process internal variable of interest and
    the corresponding parameters effecting the values of the process internal variables of interest are parameters of interest, and
a processor means responsive to each process input cell and to each process internal variable cell for determining the value of the corresponding process internal variables, a method for monitoring a spreadsheet process executed by the system to allow a determination of a gradient of a variable of interest of the process with respect to at least one parameter of the process, comprising the steps of:

reading each of the process cells of the process control area means, and selecting each input parameter of interest and each process internal variable of interest, generating, for each parameter of interest, a gradient control area for storing a plurality of gradient cells, and in each gradient control area corresponding to a parameter of interest,
  generating and inserting into the gradient control area a plurality of gradient cells, wherein
    at least one of the gradient cells is a gradient input cell corresponding to a process input cell and defining a corresponding gradient variable corresponding to the process parameter, and
    at least one of the gradient cells is a gradient internal cell defining a gradient internal variable corresponding to a process internal variable, and
    for at least one of the gradient cells defining a gradient internal variable corresponding to a process internal variable, deriving a set of operations to determine the value of the gradient of the corresponding process internal variable with respect to the parameter corresponding to the gradient control area, and for each gradient internal variable cell of a gradient control area corresponding to a parameter of interest determining the value of the corresponding gradient internal variable of interest and providing an output representing the gradient of a corresponding process variable of interest.

* * * * *